(12) United States Patent
Stanley et al.

(10) Patent No.: US 11,402,493 B2
(45) Date of Patent: *Aug. 2, 2022

(54) DETERMINING SURFACE CHARACTERISTICS

(71) Applicant: Massachusetts Institute of Technology, Cambridge, MA (US)

(72) Inventors: Byron McCall Stanley, Newton, MA (US); Matthew Tyler Cornick, San Diego, CA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 113 days.

This patent is subject to a terminal disclaimer.

(21) Appl. No.: 16/933,291

(22) Filed: Jul. 20, 2020

(65) Prior Publication Data

US 2020/0355821 A1 Nov. 12, 2020

Related U.S. Application Data

(63) Continuation of application No. 15/882,889, filed on Jan. 29, 2018, now Pat. No. 10,746,867.

(Continued)

(51) Int. Cl.
*G01S 13/88* (2006.01)
*G01S 7/41* (2006.01)
(Continued)

(52) U.S. Cl.
CPC .......... *G01S 13/885* (2013.01); *B60W 40/06* (2013.01); *G01S 7/411* (2013.01); *G01S 13/87* (2013.01);
(Continued)

(58) Field of Classification Search
CPC ........ G01S 13/885; G01S 13/87; G01S 13/89; G01S 13/951; G01S 13/872;
(Continued)

(56) References Cited

U.S. PATENT DOCUMENTS 3,366,960 A  1/1968 Gluck
4,162,509 A  7/1979 Robertson
(Continued)

FOREIGN PATENT DOCUMENTS

DE  4024842 A   2/1992
DE  40480842 A1  2/1992
(Continued)

OTHER PUBLICATIONS

Levinson, Jesse and Sebastian Thrun, "Robust Vehicle Localization in Urban Environments Using Probabilistic Maps", 2010 IEEE International Conference on Robotics and Automation, May 3-8, 2010, Anchorage, Alaska; 7 pages.
(Continued)

*Primary Examiner* — Thomas Ingram
(74) *Attorney, Agent, or Firm* — Schmeiser, Olsen & Watts LLP

(57) ABSTRACT

A method for determining surface characteristics is disclosed. The method may include transmitting a surface penetrating radar (SPR) signal towards a surface from a SPR system. The method may also include receiving a response signal at the SPR system. The response signal may include, at least in part, a reflection of the SPR signal from a surface region associated with the surface. The method may further include measuring at least one of an intensity and a phase of the response signal. The method my additionally include determining, based at least in part on the at least one of the intensity and the phase of the response signal, a surface characteristic of the surface.

12 Claims, 9 Drawing Sheets

Related U.S. Application Data

(60) Provisional application No. 62/529,740, filed on Jul. 7, 2017, provisional application No. 62/451,313, filed on Jan. 27, 2017.

(51) Int. Cl.

| | |
|---|---|
| *B60W 40/06* | (2012.01) |
| *G01S 13/87* | (2006.01) |
| *G01S 13/95* | (2006.01) |
| *G01S 13/89* | (2006.01) |
| *G01S 13/86* | (2006.01) |
| *G01C 21/36* | (2006.01) |
| *G01S 13/931* | (2020.01) |
| *G01C 21/26* | (2006.01) |

(52) U.S. Cl.
CPC ........... *G01S 13/872* (2013.01); *G01S 13/89* (2013.01); *G01S 13/951* (2013.01); *B60W 2552/00* (2020.02); *G01C 21/26* (2013.01); *G01C 21/3602* (2013.01); *G01S 13/862* (2013.01); *G01S 13/865* (2013.01); *G01S 13/867* (2013.01); *G01S 2013/9327* (2020.01)

(58) Field of Classification Search
CPC .... G01S 13/865; G01S 13/862; G01S 13/867; G01S 2013/9371; G01C 21/3602; G01C 21/26; B60W 40/06; B60W 2550/14
See application file for complete search history.

(56) References Cited

U.S. PATENT DOCUMENTS

| | | | |
|---|---|---|---|
| 4,495,589 A | 1/1985 | Hirzel | |
| 4,671,650 A | 6/1987 | Hirzel et al. | |
| 5,202,692 A | 4/1993 | Huguenin et al. | |
| 5,485,384 A | 1/1996 | Falconnet | |
| 5,497,100 A | 3/1996 | Reiser et al. | |
| 6,005,511 A | 12/1999 | Young et al. | |
| 6,082,466 A | 7/2000 | Gudat | |
| 6,362,775 B1 | 3/2002 | Goebel et al. | |
| 6,370,475 B1* | 4/2002 | Breed .................... G01S 13/931 701/301 |
| 6,445,334 B1 | 9/2002 | Bradley et al. | |
| 6,453,223 B1 | 9/2002 | Kelly et al. | |
| 6,766,253 B2 | 7/2004 | Burns et al. | |
| 7,191,056 B2 | 3/2007 | Costello et al. | |
| 7,395,156 B2 | 7/2008 | Chiou et al. | |
| 8,207,834 B2 | 6/2012 | Takemura et al. | |
| 8,207,885 B2 | 6/2012 | Hibbard et al. | |
| 8,306,747 B1 | 11/2012 | Gagarin et al. | |
| 8,457,814 B2 | 6/2013 | Hasegawa | |
| 8,730,084 B2 | 5/2014 | Al-Khalefah et al. | |
| 8,786,485 B2 | 7/2014 | Atkins et al. | |
| 8,849,523 B1 | 9/2014 | Chan et al. | |
| 8,949,024 B2 | 2/2015 | Stanley et al. | |
| 8,994,581 B1 | 3/2015 | Brown | |
| 2002/0122000 A1 | 9/2002 | Bradley et al. | |
| 2003/0090406 A1 | 5/2003 | Longstaff et al. | |
| 2004/0032363 A1 | 2/2004 | Schantz et al. | |
| 2006/0044177 A1 | 3/2006 | Wittenberg et al. | |
| 2006/0095172 A1 | 5/2006 | Abramovitch et al. | |
| 2007/0109177 A1 | 5/2007 | Baath et al. | |
| 2008/0143585 A1 | 6/2008 | Thomas et al. | |
| 2009/0051593 A1 | 2/2009 | Wiesbeck et al. | |
| 2010/0026555 A1 | 2/2010 | Whittaker et al. | |
| 2010/0052971 A1 | 3/2010 | Amarillas | |
| 2010/0066585 A1 | 3/2010 | Hibbard et al. | |
| 2010/0085175 A1* | 4/2010 | Fridthjof .......... G08G 1/096791 340/438 |
| 2010/0189498 A1* | 7/2010 | Doherty ........... G08G 1/096811 404/72 |
| 2010/0259438 A1 | 10/2010 | Jones et al. | |
| 2011/0025546 A1 | 2/2011 | Cook et al. | |
| 2012/0026329 A1 | 2/2012 | Vorobiev | |
| 2012/0271540 A1 | 10/2012 | Miksa et al. | |
| 2013/0018575 A1* | 1/2013 | Birken .................... G01S 19/14 701/409 |
| 2013/0050008 A1 | 2/2013 | Atkins et al. | |
| 2013/0113648 A1 | 5/2013 | Duvoisin, III et al. | |
| 2014/0022117 A1* | 1/2014 | Cist ........................ G01S 13/885 342/176 |
| 2014/0081507 A1* | 3/2014 | Urmson ................ B60W 40/06 701/28 |
| 2014/0121964 A1* | 5/2014 | Stanley .................. G01C 21/30 701/514 |
| 2014/0125509 A1 | 5/2014 | Stolarczyk et al. | |
| 2014/0159938 A1 | 6/2014 | Shipley et al. | |
| 2015/0268218 A1 | 9/2015 | Troxler | |
| 2016/0061948 A1 | 3/2016 | Ton et al. | |
| 2016/0097879 A1 | 4/2016 | Stolarczyk et al. | |
| 2017/0184717 A1* | 6/2017 | Feigin ..................... G01S 13/87 |
| 2018/0114305 A1 | 4/2018 | Strnad et al. | |

FOREIGN PATENT DOCUMENTS

| | | |
|---|---|---|
| JP | S61093969 A | 5/1986 |
| JP | H0227286 A | 1/1990 |
| JP | H0953939 A | 2/1997 |
| JP | H10103964 A | 4/1998 |
| JP | H10104346 A | 4/1998 |
| JP | 2001289651 A | 10/2001 |
| JP | 2003515726 A | 5/2003 |
| JP | 2004077475 A | 3/2004 |
| JP | 2007127639 A | 5/2007 |
| JP | 2011032678 A | 2/2011 |
| JP | 5935108 B1 | 6/2016 |
| KR | 20060087449 A | 8/2006 |
| WO | 2005098471 A2 | 10/2005 |
| WO | 2012167069 A1 | 12/2012 |

OTHER PUBLICATIONS

Hahnel, et al., "An Efficient FastSLAM Algorithm for Generating Maps of Large-Scale Cyclic Environments from Raw Laser Range Measurements", 2003 IEEE/RSJ International Conference on Intelligent Robots and Systems, Proceedings, pp. 206-211, vol. 1; 6 pages.

Ryan, Dorothy, "Lincoln Laboratory Demonstrates Highly Accurate Vehicle Localization Under Adverse Weather Conditions", www.ll.mit.edu/news/Highly-accurate-vehicle-localization-under-adverse-weather.html, 3 pages, Jun. 2016.

Fenn, et al., Ultrawideband Cavity-Backed Resistively Loaded Planar Dipole Array for Ground Penetrating Radar, IEEE International Symposium on Phased Array, Waltham, MA, pp. 117-123, 2013.

Cornick, et al., "Localizing Ground Penetrating Radar: A Step Toward Robust Autonomous Ground Vehicle Localization", 2015, Journal of Field Robotics, vol. 33, pp. 82-102, 2016.

Website for "Enabling Autonomous Vehicles to Drive in the Snow with Localizing Ground Penetrating Radar." MIT Lincoln Laboratory. Jun. 24, 2016. https://www.youtube.com/watch?v=rZq5FMwI8D4.

Stanley, Bryon M. "Localizing Ground-Penetrating Radar." MIT Lincoln Laboratory. Jun. 13, 2017, 30 pages.

Stanley, Bryon M. "Localizing Ground-Penetrating Radar Deep Dive." MIT Lincoln Laboratory. Jul. 12, 2017, 44 pages.

"Managing the Transition to Driverless Road Freight Transport." International Transport Forum, May 31, 2017. https://www.itf-oecd.org/managing-transition-driverless-road-freight-transport.

"Data-Led Governance of Road Freight Transport." International Transport Forum, May 31, 2017. https://www.itf-becd.org/data-led-governance-road-freight-transport.

"Commercial Vehicle On-Board Safety Systems Rountable" International Transport Forum, Jan. 5-6, 2017. http://www.itf-oecd.org/managing-transition-driverless-road-freight-transport.

Busuioc, et al. "Novel, Low-Cost Millimeter-wave System for Road Surface Characterization," 2011, SPIE vol. 7983 79831H-1.

(56) References Cited

OTHER PUBLICATIONS

International Preliminary Report on Patentability in PCT/US2017/064458 dated Oct. 31, 2019.
International Preliminary Report on Patentability in PCT/US2018/015791 dated Aug. 8, 2019.
International Preliminary Report on Patentability in PCT/US2018/015775 dated Aug. 8, 2019.
Non-Final Office Action in U.S. Appl. No. 15/830,398 dated Oct. 28, 2019.
Notice of Allowance and Fee(s) Due in U.S. Appl. No. 15/882,986, dated Jan. 17, 2020.
Notice of Allowance and Fee(s) Due in U.S. Appl. No. 15/830,398, dated Mar. 25, 2020.
Non-Final Office Action in U.S. Appl. No. 15/882,889 dated Nov. 18, 2019.
Notice of Allowance in U.S. Appl. No. 15/882,889 dated Apr. 16, 2020.
International Search Report and Written Opinion in PCT/US2018/015775 dated Apr. 13, 2018.
International Search Report and Written Opinion in PCT/US2018/015791 dated May 10, 2018.
International Search Report and Written Opinion in PCT/US2017/064458 dated Feb. 5, 2018.
International Search Report and Written Opinion in PCT/US2013/030682 dated Dec. 16, 2013.
International Preliminary Report on Patentability in PCT/US2013/030682 dated May 7, 2015.
Non-Final Office Action in U.S. Appl. No. 13/798,416 dated May 28, 2014.
Non-Final Office Action in U.S. Appl. No. 13/798,416 dated Sep. 17, 2014.
Notice of Allowance in U.S. Appl. No. 13/798,416 dated Nov. 17, 2014.
Zhang, et al. "California PATH Magnetic Guidance System", Itelimotion, vol. 7, No. 4, 1998.
Extended Search Report in European Patent Application No. 18744920.2 dated Oct. 6, 2020.
Office Action in Japanese Patent Application No. 2019-539213 dated Aug. 25, 2020.
Notice of Refusal in Japanese Patent Applicaiton No. 2019-539238 dated Oct. 27, 2020.
Notice of Refusal in Japanese Patent Applicaiton No. 2019-539239 dated Oct. 27, 2020.
Extended Search Report in European Patent Application No. 18744057.3 dated Nov. 11, 2020.
Notice of Refusal in Japanese Patent Application No. 2019-539238 dated Apr. 27, 2021.
Notice of Refusal in Japanese Patent Application No. 2019-539239 dated Jun. 1, 2021.
Extended Search Report in European Patent Application No. 17894510.1 dated Jan. 25, 2021.
Examination Report in European Patent Application No. 18744057.3 dated Mar. 4, 2022.

\* cited by examiner

DETERMINING SURFACE CHARACTERISTICS

RELATED APPLICATIONS

This application is a continuation of U.S. patent application Ser. No. 15/882,889, filed Jan. 29, 2018 and titled "Determining Surface Characteristics," which claims the benefit of the earlier filing date of U.S. Provisional Patent Application No. 62/451,313, filed Jan. 27, 2017 and titled "LGPR Capability," and U.S. Provisional Patent Application No. 62/529,740, filed Jul. 7, 2017 and titled "Localizing Ground-Penetrating Radar," the entireties of which are incorporated herein by reference.

GOVERNMENT RIGHTS IN THE INVENTION

This invention was made with government support under Contract No. FA8721-05-C-0002 awarded by the U.S. Air Force. The government has certain rights in the invention.

FIELD OF THE INVENTION

The present invention relates generally to a method and a system for determining surface characteristics. The method and system may be used for controlling a vehicle.

BACKGROUND OF THE INVENTION

Autonomous navigation of vehicles may require sensing of real-world environments or extensive prior knowledge of environments (e.g., roads). Real-world environments are variable and detailed prior maps may not account for changes in navigation conditions such as road surface conditions. Thus, there may be a need for methods and systems to facilitate determining surface characteristics, which may assist in autonomous navigation of vehicles.

SUMMARY

Exemplary embodiments of the present technology include a method for navigating a vehicle based on ground characteristics and a system for navigating a vehicle based on surface characteristics.

In some embodiments of the method, a ground penetrating radar (GPR) signal is transmitted towards a surface from a GPR system. A response signal is received at the GPR system. The response signal includes, at least in part, one or more of a reflection of the GPR signal from a surface region associated with the surface and a reflection of the GPR signal from a subsurface region behind the surface. At least one of an intensity and a phase of the response signal is measured. Based at least in part on the at least one of the intensity and the phase of the response signal, at least one of a surface characteristic of the surface and a GPR image of the subsurface region is determined. A vehicle is navigated based, at least in part, on at least one of the surface characteristic of the surface and the GPR image of the subsurface region.

Navigating the vehicle may include generating a vehicle navigation command for one or more vehicle control systems and may include controlling at least one of steering, orientation, velocity, pose acceleration and deceleration.

Measuring at least one of an intensity and a phase of the response signal may include measuring at least one of an intensity and a phase for each frequency in a plurality of frequencies in the response signal.

Determining the surface characteristic and/or determining the GPR image may be based on at least one of a transfer function and a frequency response. The surface characteristic may be one or more of snow, ice, water, mud, slush, sand and salt.

Determining the surface characteristic and/or determining the GPR image may include using at least one of the response signal and the measured intensity or phase of the response signal, and an output of a sensor. The sensor may be one or more of an optical sensor, an inertial navigation system (INS), a global positioning system (GPS), a sound navigation and ranging (SONAR) system, a light detection and ranging (LIDAR) system, a camera, an inertial measurement unit (IMU), a wheel slip sensor/encoder and an auxiliary radar system.

In some embodiments of the system, the system includes at least one GPR channel, at least one vehicle control system and a GPR processor. Each GPR channel includes at least one GPR transmit element and at least one GPR receive element. The GPR processor is in communication with the one or more GPR receive elements and the vehicle control system. In response to receiving a response signal from the GPR receive element, the GPR processor measures at least one of an intensity and a phase of a response signal received at the GPR receive element(s). The response signal includes, at least in part, at least one of a reflection of a transmitted GPR signal from a surface region associated with a surface and a reflection of the GPR signal from a subsurface region behind the surface. The GPR processor determines, based at least in part on the intensity or the phase of the response signal, at least one of a surface characteristic of the surface and a GPR image of the subsurface region. The GPR processor generates a vehicle navigation command for the at least one vehicle control system based, at least in part, on at least one of the surface characteristic and the GPR image.

The determination of the surface characteristic and/or the GPR image may be based on the at least one of the response signal and the measured intensity or phase of the response signal and further based on an output of a sensor. The sensor may be associated with one or more of: an optical sensor, an INS, a GPS, a SONAR system, a LIDAR system, a camera, an IMU, a wheel slip sensor/encoder and an auxiliary radar system.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon showing the principles of the invention.

DETAILED DESCRIPTION

Figure 1:
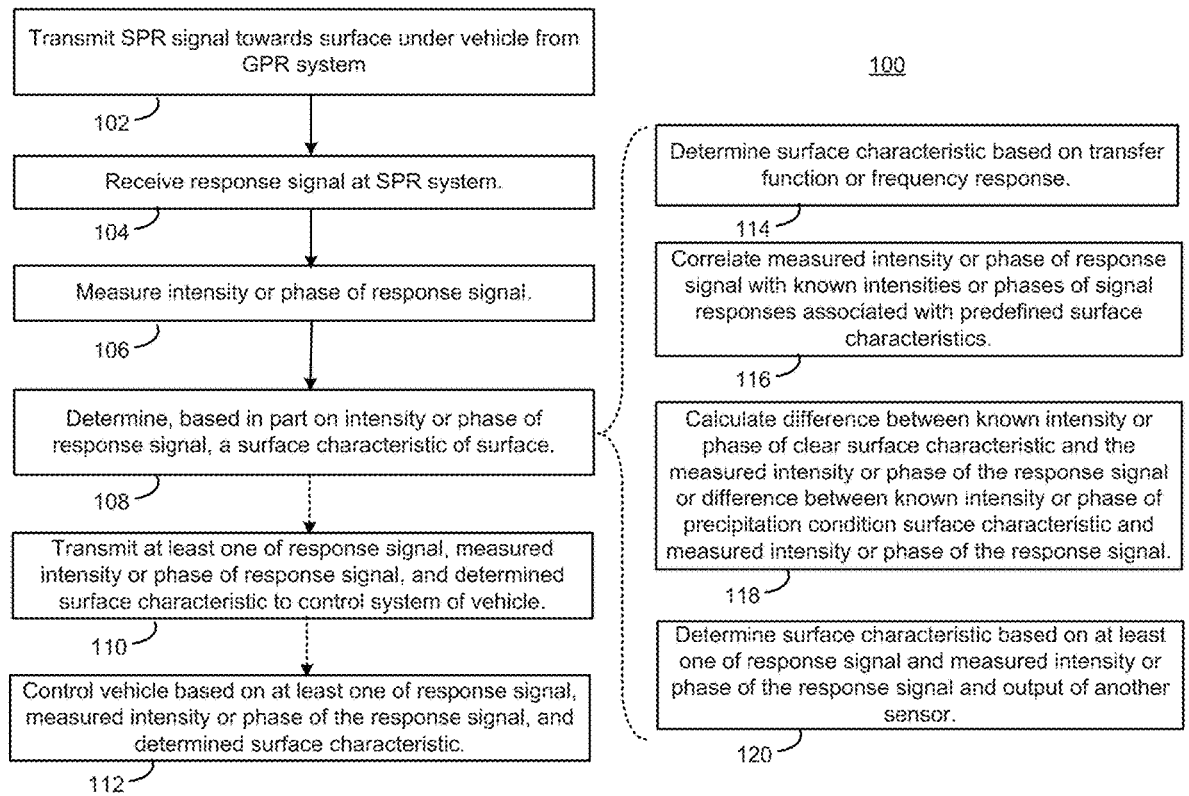
FIG. 1 is a flowchart representation of an embodiment of a method for determining surface characteristics in accordance with the present disclosure.

Reference is made in various embodiments described below to ground and a surface of the ground. It will be understood that the ground includes soil, road surface or pavement such as asphalt and concrete layers, gravel, sand and the like, and that the surface of the ground is the interface of the ground with the air, array, fluid, snow, rain, sludge, mud, or free space. In some instances, the surface may also include the surfaces that surround a tunnel, mineshaft, bridge, elevated platform, and/or other passageways through which a vehicle may travel. The term surface region as used herein includes a depth of a layer of a condition or substance on the surface. For example, the surface region may also include what is inside a layer of snow on a road or a layer of mud on the ground and/or part of the ground itself.

More generally, reference is made herein to surface penetrating radar (SPR) and ground penetrating radar (GPR). As used herein, SPR means any radar system that is configured to acquire data from a subsurface region. A SPR can be configured and oriented to obtain data for a subsurface region that is behind the surface of a wall, ceiling, floor or one or more surfaces along a tunnel or passageway. In some instances, the SPR can also obtain data for the surface. It will be recognized that a GPR system is a type of SPR system which is configured to acquire data from a region below the surface of the ground and may also acquire data for the surface of the ground. A subsurface region, as used herein, means a region behind the surface such as an underground region behind the ground surface. Alternatively, the subsurface region can be a region behind a surface of a structure, such as a region inside and/or behind a wall or ceiling structure.

In brief overview, the present disclosure relates to methods and systems for determining surface characteristics. The method may include transmitting a surface penetrating radar (SPR) signal towards a surface under a vehicle from a SPR system. The method may also include receiving a response signal at the SPR system. The response signal may include, at least in part, a reflection of the SPR signal from a surface region associated with the surface. The method may further include measuring an intensity or phase of the response signal. The method my additionally include determining, based at least in part on the intensity or phase of the response signal, a surface characteristic of the surface. In an implementation, the SPR system may also be used in a localization application for the vehicle.

Methods and systems for localization of a vehicle using SPR or GPR are described, for example, in U.S. patent application with Ser. No. 15/830,398, titled "Method and System for Localization of a Vehicle Using Surface Penetrating Radar" and in U.S. Pat. No. 8,949,024, titled "Vehicle Localization Using Surface Penetrating Radar," the disclosures of which are both incorporated herein by reference in their entirety. Further, methods and systems for detecting and locating changes in an underground region are described, for example, in U.S. Pat. No. 8,786,485, titled "Mobile Coherent Change Detection Ground Penetrating Radar," the disclosure of which is incorporated herein by reference in its entirety. Although the methods and systems described herein are discussed in the context of facilitating autonomous ground vehicle navigation, the methods and systems may be useful for other types of navigation. The facilitation of autonomous vehicle navigation is not limited to automobiles and other forms of surface vehicles traveling on land. Instead the techniques and features for facilitation of autonomous vehicle navigation described in the present disclosure may be applied to navigation on water, underwater, underground, indoors, or by flight (and, e.g., exoplanetary exploration).

Figure 2:
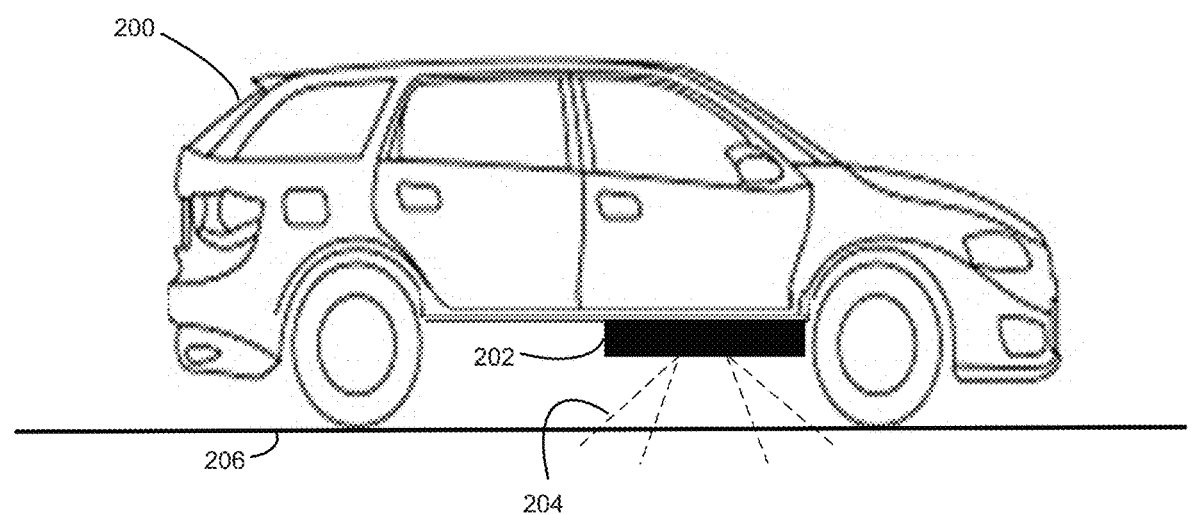
FIG. 2 shows a side view of a vehicle equipped with a SPR system in accordance with the present disclosure.

Referring to FIG. 1, a flowchart of a method 100 for determining surface characteristics in accordance with the present disclosure is shown. Referring also to FIG. 2, a side view of a vehicle 200 equipped with a SPR system 202 in accordance with the present disclosure is shown. It should be noted that while SPR system 202 and other SPR systems described in the present disclosure may be designed for performing ground penetrating radar operations and collected data for subsurface imaging, surface information or data, i.e., data for the interface of the subsurface region with air or the local environment, can also be collected by SPR systems. The strongest return signal received by the SPR system may typically be based on the reflection caused by the surface.

Although depicted as an automobile, the vehicle 200 may be any mobile platform or structure, including by way of non-limiting examples, platforms for transporting passengers or payloads such as equipment, sensors and other objects. The vehicle 200 may have the capability to change direction (i.e., steer), accelerate and decelerate. Although the vehicle 200 in the illustration is generally understood to be non-holonomic as its controllable degrees of freedom are less than the total degrees of freedom, a holonomic vehicle, such as a vehicle with omnidirectional wheels, is also contemplated. In other embodiments, the vehicle 200 may be capable of changing one or more of its altitude (or distance from the surface of the ground), pitch, yaw and roll. The vehicle 200 may include a SPR-based navigation system and may be operated in an autonomous mode. In other words, passenger operation of the vehicle 200 may be limited or absent, and there may be no remote commands received by the vehicle 200 for navigation. By way of an example, limited operation may include control of the speed by a passenger while other operations remain under autonomous control.

In an embodiment, method 100 may include transmitting 102 a ground penetrating radar (SPR) signal (e.g., signal 204) towards a surface (e.g., surface 206) under vehicle 200 from a SPR system 202. SPR system 202 may include an antenna array fixed to the underside of vehicle 202. The SPR antenna array may include a linear configuration of spatially-invariant transmit and receive antenna elements for transmitting and receiving radar signals. Signal 204 may be transmitted by one of the transmit antenna elements of the SPR antenna array. In other embodiments, the SPR antenna array may be located elsewhere on the vehicle 202 (e.g., fixed to the front of the vehicle) and the transmit and receive antenna elements may not be linearly arranged. The SPR antenna array may be nominally or substantially parallel to the ground surface 206 and may extend parallel or perpendicular to the direction of travel. SPR signals (e.g., signal 204) may propagate downward from the transmitting antenna elements to and/or through the road surface 206 under the vehicle 202. The SPR signals may be backscattered in an upward direction from the surface 206 and may be detected by the receiving antenna elements.

In various implementations, the SPR signal may comprise frequencies or ranges of frequencies which may be selected based on sensitivity to water or other surface characteristics. Frequency responses may be analyzed to determine suitable frequencies for the SPR signal. For example, frequency selection may be based on the response for each frequency as it relates to reflection from various surface characters (e.g., snow, ice, water, mud, slush, sand, and/or salt). Frequencies may be selected such that particular depth ranges or feature types, stabilities, clutter levels and features sizes are emphasized or deemphasized in the data. Thus, frequency selection may allow emphasis for surface characters such as snow, ice, water, mud, slush, sand, and/or salt). For example, the higher the frequency, the more attenuation and/or reflection from water or snow and the less penetration into the surfaces may occur. Higher frequency can also cause a slightly different phase shift.

Figure 5:
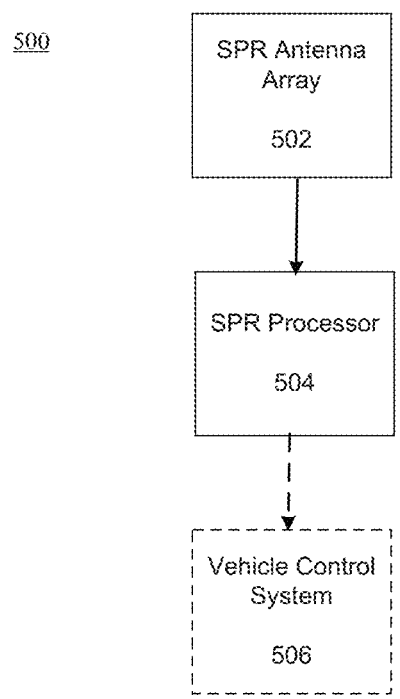
FIG. 5 shows an example SPR system in accordance with the present disclosure.

Referring now to FIG. 5, an example SPR system in accordance with the present disclosure is shown. SPR system 500 may be a mobile SPR system and may include SPR antenna array 502. For example, SPR antenna array 502 may be fixed to the underside of vehicle. SPR antenna array 502 may include one or more transmit and receive antenna elements for transmitting and receiving radar signals. Further, SPR antenna array 502 may be in communication with SPR processor 504 which may control SPR antenna array 502. A radar transceiver may send and receive the signal. The processor may be a general purpose processor, GPU, or similar. For example, SPR processor 504 may control the transmit operations of SPR antenna array 502 or one or more of the transmit and receive antenna elements therein. SPR processor 504 may receive return radar signals from SPR antenna array 502 or one or more of the antenna elements therein. SPR system 202 of FIG. 2 may be the same as, similar to, or an implementation of SPR system 500.

In this implementation, SPR system 500 may also include one or more components for performing localization operations of the vehicle. For example, SPR system 500 may include a registration module, conversion module, user interface, and/or reference image source, as discussed in more detail in U.S. patent application with Ser. No. 15/830, 398, mentioned above. In this way, the SPR system may also be used in a localization application for the vehicle (e.g., vehicle 200). The SPR system may also be used for traction control, auto pilot, and human operator warning, among other applications or operations.

Referring back to FIG. 1, method 100 may also include receiving 104 a response signal at SPR system 202. The response signal may include, at least in part, a reflection of the SPR signal (e.g., signal 204) from a surface region associated with the surface 206 under vehicle 200. The response signal may be received by one of the receive antenna elements of the SPR antenna array of SPR system 202. The transmit and receive antennas may be the same type of element, different styles of elements, or be positioned in different locations. Differing types of antennas and positions may affect the resulting data and compatibility with maps should be considered.

Figure 3:
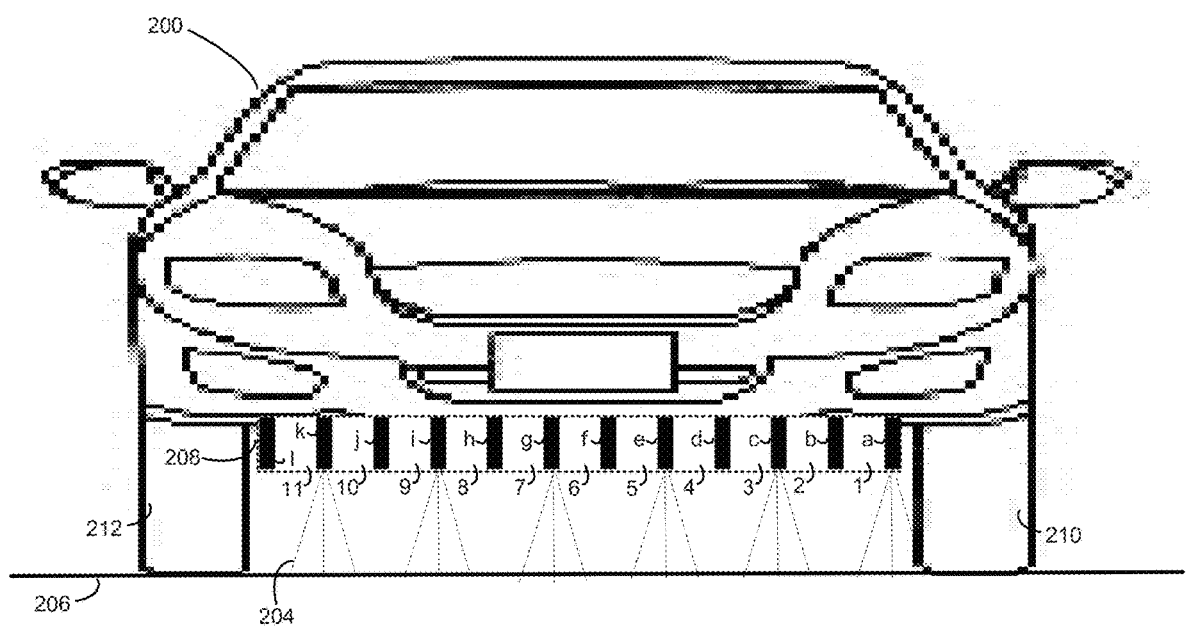
FIG. 3 shows a front view of a vehicle equipped with a SPR system in accordance with the present disclosure
Figure 4:
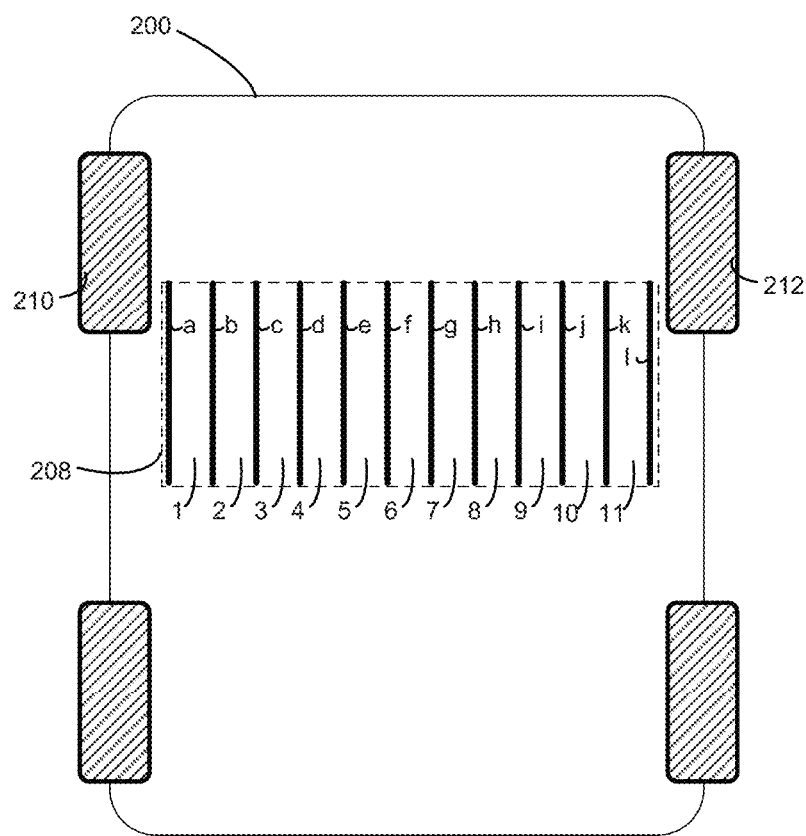
FIG. 4 shows a bottom view of a vehicle equipped with a SPR system in accordance with the present disclosure.

Referring to FIG. 3 and FIG. 4, front and bottom views of vehicle 200 are shown. SPR system 202 may include SPR antenna array 208. SPR antenna array 208 may include antenna elements a-1. While SPR antenna array 208 may include twelve antenna elements a through 1, this configuration is shown for illustrative purposes only and SPR antenna array 208 may include other numbers of antenna elements or other configurations. Antenna elements a through 1 may form eleven channels (e.g., channels 1-11). Each channel may include a transmit and a receive element or a transmit and a receive pair. For example, there may be twelve elements across SPR antenna array 208 positioned across the vehicle from the driver's side to passenger side. In an implementation, transmit and receive elements or antennas may be collocated or may be the same element.

In an implementation, channel 1 may be aligned with or near front tire 210 on the driver's side of vehicle 200. Channel 11 may be aligned with or near the front tire 212 on the passenger's side of vehicle 200. A set of antennas (e.g., antennas a and b) may be about 2 feet long. Each antenna may be oriented between the front and back tires of vehicle 200. One antenna (e.g., antenna a) of the channel may transmit and one antenna (e.g., antenna b) may receive. The antennas may be bar-shaped and may be spaced apart by five inches from each other. For example, antenna a may be next to front driver's side tire 210 and antenna b may be five inches closer to front passenger's side tire 212. Additional antennas c-1 may be positioned at five-inch spacings towards the passenger's side until the last antenna (1) is near passenger's side front tire 212. In this way, the SPR systems described herein may include a plurality of SPR antennas and channels positioned under the vehicle and each channel may include at least one transmit element and at least one receive element.

Referring to FIG. 1, method 100 may also include measuring 106 an intensity or phase of the response signal. The intensity or phase of the response signal may be measure by the SPR processor (e.g., SPR processor 504) and/or one or more other instruments included in the SPR system such as a voltmeter or amp meter. The SPR processor may receive the response signal from one or more of the SPR antenna elements. The measured intensity or phase of the response signal may be at least one of a voltage and a power or current. When the signal is received at the antenna, it may be adapted, filtered, and/or sampled so as to preserve intensity and phase information.

Method 100 may additionally include determining 108, based at least in part on the intensity or phase of the response signal, a surface characteristic of the surface (e.g., surface 206) under the vehicle (e.g., vehicle 200). The surface characteristic may be one or more of snow, ice, water, mud, slush, sand, gravel, dirt, rock, debris and salt, etc.

In an implementation, determining the surface characteristic may be based (114) on a transfer function or frequency response. The transfer function may be created by recording the magnitude (intensity) and phase of the response for more than one frequency. This response can be isolated to the surface region response and compared with known prior passes (clean or otherwise), or responses for particular material types. Increase in water content in soils has been shown to shift the peak frequency of the subsurface response.

Determining the surface characteristic may include correlating 116 the measured intensity or phase of the response signal with known intensities or phases of signal responses associated with a plurality of predefined surface characteristics (e.g., snow, ice, water, mud, slush, sand, and salt.) For example, a range of known intensities for signal responses associated with snow may be correlated with the measured intensity or phase of the response signal associated with signal 204 to determine that snow is a surface characteristic of surface 206 at a given time. In an implementation, the correlating operation 116 may be used when the response signal characteristics or range for, e.g., snow or ice, are already known and a current response signal is being correlated with prior information to determine surface characteristics. In this way, surface characteristics may be determined in real time or near real time which may benefit active drive control or real time control of the vehicle.

Determining the surface characteristic may alternatively or additionally include calculating 118 a difference between a known intensity or phase of a clear surface characteristic (e.g., no precipitation or fluid on a road) and the measured intensity or phase of the response signal. The known intensity of a clear surface characteristic may be a baseline number or range. By isolating the response to the area at and surrounding the road surface, given a known (or measured) road surface reflection, a threshold may be set to indicate that the reflection is higher than expected and may translate into surface condition changes (e.g., such as snow). It should be noted that an opposite operation may also be performed where a data set on a wet day may be used to make a comparison (e.g., with dry, wet, snowy, etc.). For example, data from a precipitation condition surface characteristic (e.g., a wet, icy, or snow day) may be used as a baseline to make calculations and correlations to determine dry or wet surface characteristics or conditions. Thus, determining the surface characteristic may alternatively or additionally include calculating 118 a difference between a known intensity or phase of a precipitation condition surface characteristic and the measured intensity or phase of the response signal. In various implementations, determining the surface characteristic may include both correlating 116 and calculating 118 operations described above, which may allow for more accurate determination of surface characteristics of conditions.

In an implementation, a series of sweeps may be used to obtain more accurate data for determining surface characteristics. A sweep may be one set of responses across a SPR antenna array. There may be times when the SPR system is more sensitive or less sensitive due to a variety of environmental factors and multiple sweeps may be required to accurately determine surface characteristics or conditions in those instances. In an implementation, a sweep may be performed in $\frac{1}{126}$th of a second. Eight to ten seconds of sweeps may provide a large enough response to determine surface characters or conditions.

In various implementations, determining the surface characteristic may include using (120) one or more of the response signal itself, the measured intensity or phase of the response signal and/or an output of another sensor. Another sensor may provide information or data which may be used to determine surface characteristics and may include an optical sensor or one or more other sensors associate with an inertial navigation system (INS), a GPS, a sound navigation and ranging (SONAR) system, a LIDAR system, a camera, an inertial measurement unit (IMU), a wheel slip sensor/encoder, and an auxiliary radar system. As the data from these other sensors is complementary, it can be used to identify the particular surface conditions with more accuracy and robustness when the results are fused with those of the SPR system.

Figure 6:
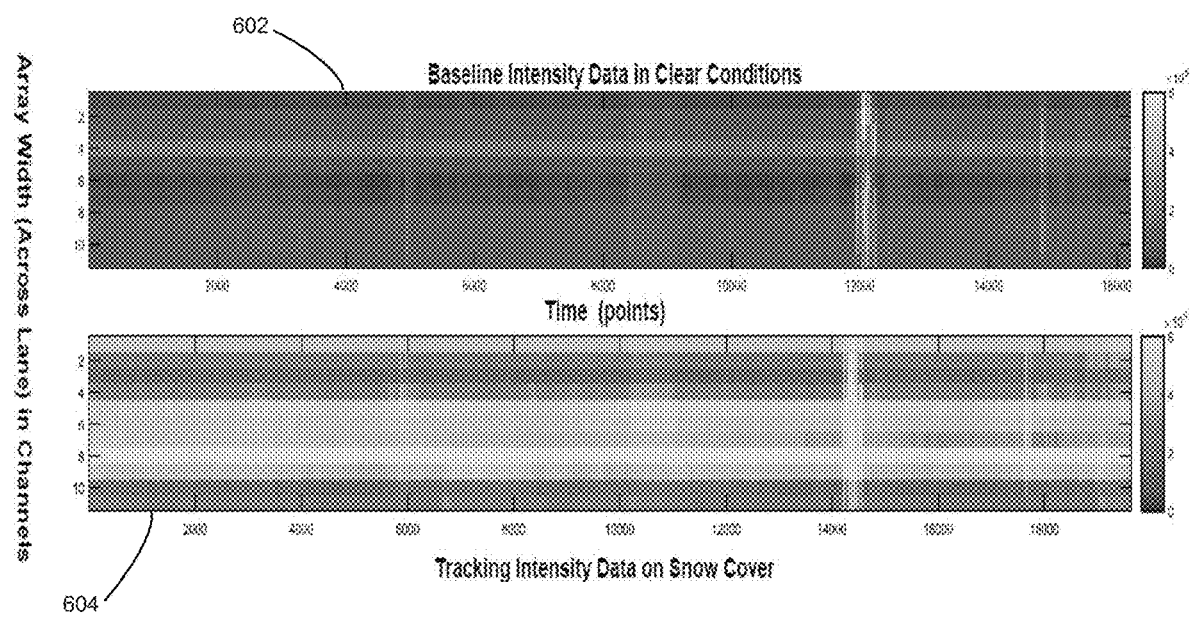
FIG. 6 shows example plots depicting road surface characteristics in accordance with the present disclosure.

Referring now to FIG. 6, example plots depicting road surface characteristics and conditions determined using the techniques and features described here are shown. The top and bottom plots show road surface conditions in two different cases. Plot 602 shows a dry surface or pavement with no snow. From top to bottom in plot 602, responses from channels 1-11 in the SPR antenna array are shown (i.e., marked at intervals of 2, 4, 6, 8, 10 on the left side). Measurements of signal intensity are obtained and shown from left to right, across the vehicle. The lower axis (i.e., marked 2000-16000 points) represents time, which translates into distance travelled by the vehicle. Plot 602 depicts intensity of the response from the top layer of the road (i.e., surface). The signal intensity measurements may translate into voltage that that is actually measured. The lightness and darkness of the plot 602 depicts how high the intensity of the reflection from the top of the road surface is. The measurement shown represents the intensity (e.g., in voltage or power) of the signal response coming off of the top of the road. The plots show for a vehicle equipped with a SPR antenna array being driven along a certain distance of road, for a certain time period, what the reflected signal intensity looks like.

Surface signal reflection data may be recorded 126 times per second. Each point may represent one sweep or one set of measurements across all eleven channels. Thus, around 16000 points shown are shown. If divided by 126, the rough time period for each plot can be calculated. In some situations, data collection from the SPR antenna array may be limited. For example, if there is not enough motion from the vehicle, data may not be recorded, and the sample may be a longer time period than $\frac{1}{126}$th of a second. For example, if the vehicle is sitting still, data may not be record.

On the right side of plots 602 and 604, a scale of 0, 2, 4, and $6 \times 10^5$ is shown. This is a measure of intensity proportional to power. By matching the colors in the scale to the colors in, for example, plot 602, it can be seen the response signal intensity if low, on the order of $1 \times 10^5$. This is because plot 602 represents data from clear road surface conditions. For plot 604, which represents data from snowy road surface conditions, it can be seen that response signal intensity is relatively high, near $6 \times 10^5$, with some measurements near $2 \times 10^5$ and $4 \times 10^5$ in portions of the plot. It can be seen that in plot 602, in the 12000 time-point range, a reflectional outlier was detected on the road surface. This may have been a region with water or with a metal road structure.

In this way, surface characteristic data can be measured and passed on to vehicle control systems for use in automated vehicle control. Various thresholds for recognizing rain, snow, etc., can be used for acting on the surface condition data provided. In some situations, vehicle control systems may receive raw SPR antenna data. This underlying data being used to determining the surface characteristics may be same or similar to data being used for localization applications.

Figure 7:
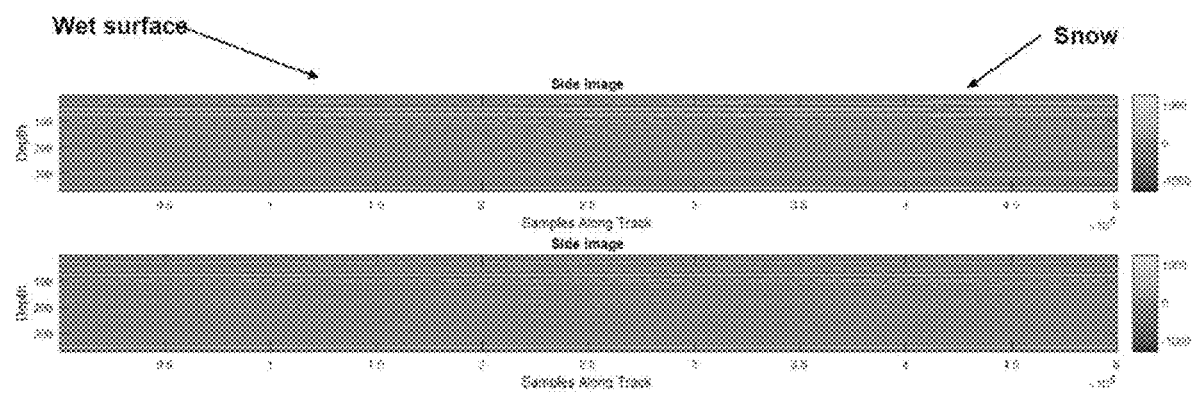
FIG. 7 also shows example plots depicting road surface characteristics in accordance with the present disclosure.

FIG. 7 shows a side cross section of the data as it penetrates the ground. The top part of the depth axis may be the surface of the road. The wet surface is shown on the top plot whereas a dry surface is shown on the bottom plot. The increase in intensity of the response is shown by the change in color or darkness.

Figure 8:
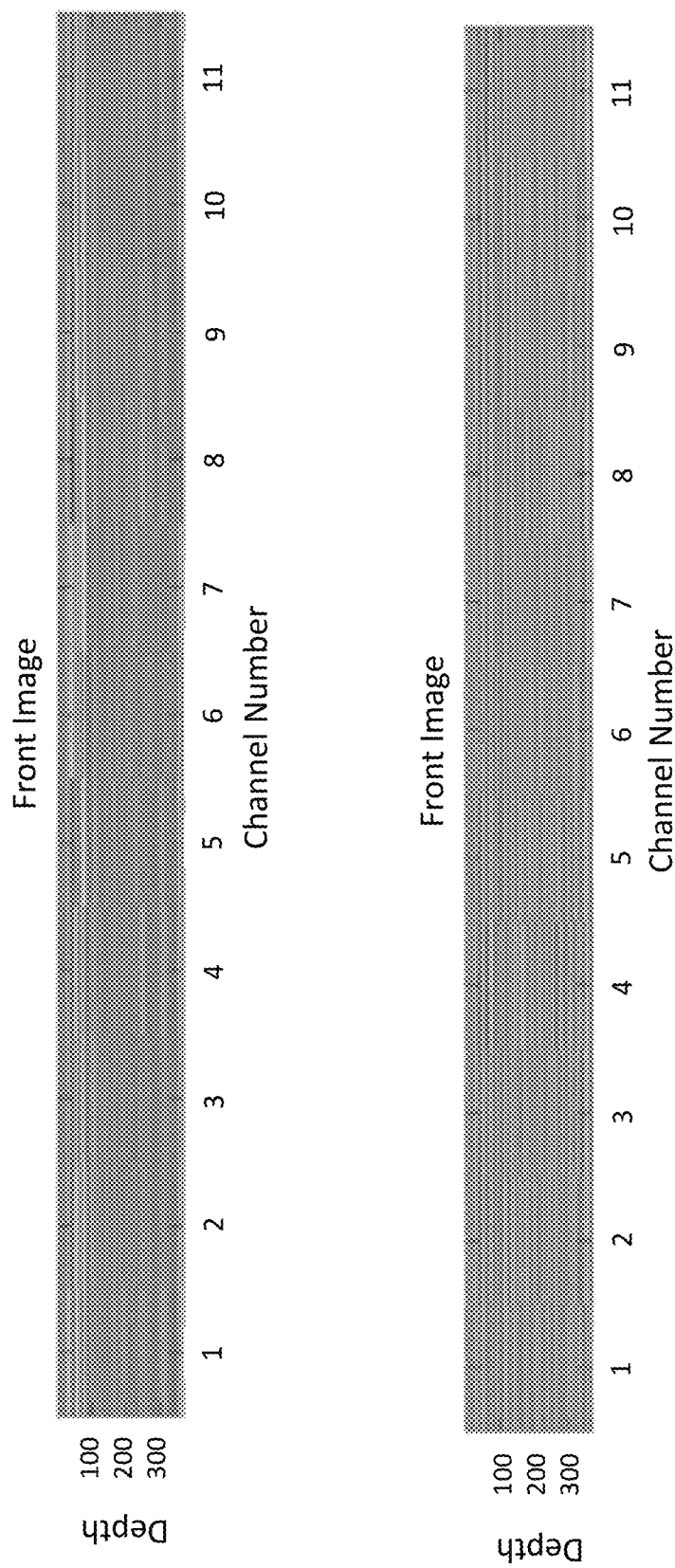
FIG. 8 also shows example plots depicting road surface characteristics in accordance with the present disclosure.

FIG. 8 shows front cross section of the data and depth versus width of an array over the 11 channels. Snow and wet surface reflections are shown on the top of the top plot. Clear conditions are shown on the bottom plot.

Figure 9:
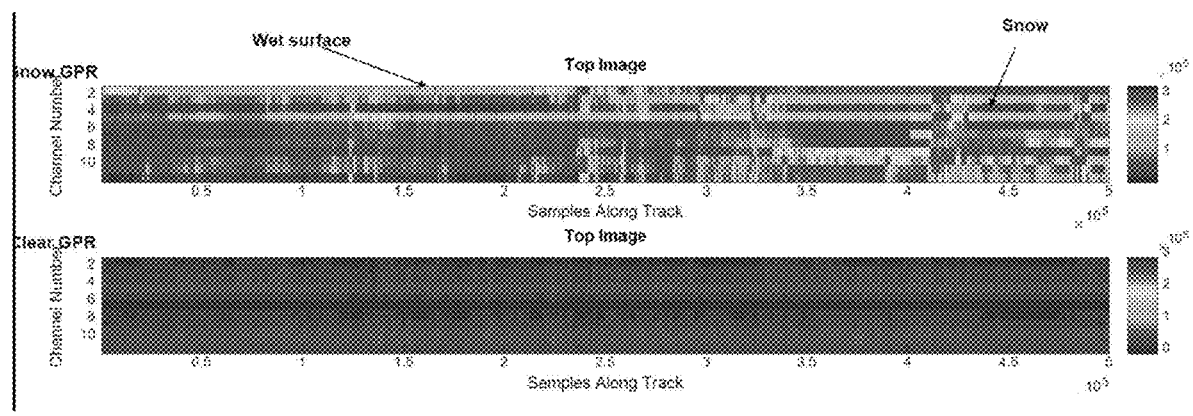
FIG. 9 also shows example plots depicting road surface characteristics in accordance with the present disclosure.

FIG. 9 shows the road surface with (top) and without (bottom) snow and precipitation.

In an implementation, method 100 may also include transmitting 110 one or more of the response signal, the measured intensity or phase of the response signal, and the determined surface characteristic (e.g., snow, ice, water, mud, slush, sand, and salt) to one or more control systems (e.g., vehicle control system 506) of the vehicle (e.g. vehicle 200). The response signal, the measured intensity or phase of the response signal, and/or the determined surface characteristic may be transmitted over a wired connection or wirelessly to the vehicle control system, as the vehicle control system may be in communication with the SPR processor (e.g., SPR processor 504). Method 100 may also include controlling 112 the vehicle (e.g., vehicle 200) based on or more of the response signal, the measured intensity or phase of the response signal, and the determined surface characteristic. Controlling the vehicle may be performed by, for example vehicle control system 506 or one or more other control systems or algorithms integrated with vehicle 200.

It should be noted that the vehicle control system may be an autonomous vehicle controller or a human who is being warned of conditions or a traction control system, among others systems or variations. The autonomous vehicle controller or human may drive more carefully (e.g. take wider or slower turns, etc.) so as to not lose traction in slippery conditions, upon, for example, receiving a warning of the conditions.

Controlling vehicle may include controlling the velocity, acceleration, orientation, angular velocity and/or angular acceleration of the vehicle and the vehicle may be continuously controlled via one or more vehicle navigation commands to maintain the vehicle at a desired position along a trip path or to maintain safety of the vehicle or any passengers in the vehicle, based in part on surface characteristics or surface conditions determined using the techniques and features described in the present disclosure. Controlling the vehicle may also include providing information to or assisting with traction control systems. Controlling the vehicle may also include individual wheel torque or traction control and a human driver may be warned and act as a result (e.g., change turn rate, etc.) In some implementations, location data for the vehicle may be used in combination with the surface characteristic data provided by the SPR system and/or one or more other sensors or navigation systems to guide or control the vehicle. Such sensor and navigation systems may include, by way of examples, an inertial navigation system (INS), a GPS, a sound navigation and ranging (SONAR) system, a LIDAR system, a camera, an inertial measurement unit (IMU) and an auxiliary radar system.

In an implementation, commands generated by an autonomous vehicle navigation system may use the surface characteristic or condition data described herein to affect a vehicle path change to reduce or minimize the differences between the vehicle track and a trip path. For example, the speed of the vehicle may be modified along segments of the trip path to maintain safe operation, to accommodate speed limits (e.g., which may be affected by surface conditions) and to achieve a desired completion time for traversing the trip path.

In an implementation, steering, orientation, velocity, pose and acceleration/deceleration may controlled in a manner to maintain safety of the vehicle or its passengers based on the surface characteristic or condition data described here. For example, the vehicle control system may include or cooperate with electrical, mechanical and pneumatic devices in the vehicle to achieve steering and speed control. In other embodiments having various types of propulsion and control mechanisms, a vehicle control system may also include or cooperate with one or more hydraulic, turbine, propeller, control surface, shape changing, and chemical systems or devices.

In this way, using the techniques and features described in the present disclosure, real time or near real time control adjusted for various surface conditions (e.g., snow, ice, water, mud, slush, sand, and salt) may be achieved. The real time or near real time control may be achieved for autonomous vehicle navigation or control systems or manual driving systems (e.g., assisted by use of the methods and systems for determining surface characteristics described herein) to maximize safety of the vehicle and/or passengers of the vehicle in adverse road surface conditions.

In an implementation, the methods and systems for determining surface characteristics described herein may also be used to collect surface information from multiple vehicles and use that prior information for controlling subsequent vehicles moving towards the same surface. This feature may be implemented through vehicle to vehicle communication, vehicle to structure communication, or potentially sending the surface condition information to a central surface conditions or autonomous vehicle control network and back to the vehicle desired to be controlled.

In an implementation, for localization applications, surface-based radar signal responses may be used to determine differences between map versions where repavement has occurred. For example, when roads are repaved or resurfaced, the prior the surface may be removed and new asphalt may be applied. There may be differences in the old and new asphalt such as in density and radar signal reflections may be different. Surface-based radar signal responses may also be combined with other sensor data (e.g., from optical sensors) to obtain more robust data sets. As the other sensors may measure different characteristics of the surface conditions, combining the data from various sensors may allow for a more accurate and robust method of determining the surface characteristics.

While the invention has been shown and described with reference to specific embodiments, it should be understood by those skilled in the art that various changes in form and detail may be made therein without departing from the scope of the invention.

What is claimed is:

1. A method for navigating a vehicle based on ground characteristics, the method comprising:
   transmitting a ground penetrating radar (GPR) signal towards a surface from a GPR system;
   receiving a response signal at the GPR system, the response signal including, at least in part, at least one of a reflection of the GPR signal from a surface region associated with the surface and a reflection of the GPR signal from a subsurface region behind the surface;
   measuring at least one of an intensity and a phase of the response signal;
   determining, based at least in part on the at least one of the intensity and the phase of the response signal, at least one of a surface characteristic of the surface and a GPR image of the subsurface region; and
   navigating a vehicle based, at least in part, on at least one of the surface characteristic of the surface and the GPR image of the subsurface region.

2. The method of claim 1 wherein navigating the vehicle comprises generating a vehicle navigation command for one or more vehicle control systems.

3. The method of claim 1 wherein navigating the vehicle comprises controlling at least one of steering, orientation, velocity, pose acceleration and deceleration.

4. The method of claim 1 wherein measuring at least one of the intensity and the phase of the response signal comprises measuring at least one of an intensity and a phase for each frequency in a plurality of frequencies in the response signal.

5. The method of claim 1, wherein determining the surface characteristic and/or determining the GPR image is based on at least one of a transfer function and a frequency response.

6. The method of claim 1, wherein the surface characteristic is at least one of snow, ice, water, mud, slush, sand and salt.

7. The method of claim 1, wherein determining the surface characteristic and/or determining the GPR image comprises using at least one of the response signal and the measured intensity or phase of the response signal, and an output of a sensor.

8. The method of claim 7, wherein the sensor is one or more of an optical sensor, an inertial navigation system (INS), a global positioning system (GPS), a sound navigation and ranging (SONAR) system, a light detection and ranging (LIDAR) system, a camera, an inertial measurement unit (IMU), a wheel slip sensor/encoder and an auxiliary radar system.

9. A system for navigating a vehicle based on surface characteristics, the system comprising:
- at least one ground penetrating radar (GPR) channel comprising at least one GPR transmit element and at least one GPR receive element;
- at least one vehicle control system; and
- a GPR processor in communication with the at least one GPR receive element and the vehicle control system, wherein the GPR processor, in response to receiving a response signal from the GPR receive element:
  - measures at least one of an intensity and a phase of a response signal received at the GPR receive element, the response signal including, at least in part, at least one of a reflection of a transmitted GPR signal from a surface region associated with a surface and a reflection of the GPR signal from a subsurface region behind the surface;
  - determines, based at least in part on the intensity or the phase of the response signal, at least one of a surface characteristic of the surface and a GPR image of the subsurface region; and
  - generates a vehicle navigation command for the at least one vehicle control system based, at least in part, on at least one of the surface characteristic and the GPR image.

10. The system of claim 9, wherein the GPR processor determines the surface characteristic and/or the GPR image based on the at least one of the response signal and the measured intensity or phase of the response signal and further based on an output of a sensor.

11. The system of claim 10, wherein the sensor is associated with one or more of: an optical sensor an inertial navigation system (INS), a global positioning system (GPS), a sound navigation and ranging (SONAR) system, a light detection and ranging (LIDAR) system, a camera, an inertial measurement unit (IMU), a wheel slip sensor/encoder and an auxiliary radar system.

12. The system of claim 9 wherein the surface characteristic is at least one of snow, ice, water, mud, slush, sand and salt.

* * * * *